United States Patent Office 2,897,198
Patented July 28, 1959

2,897,198
11α-ALKENE-11β-HYDROXY-5β-PREGNANES

William J. Wechter and Gunther S. Fonken, Kalamazoo, Mich., assignors to The Upjohn Company, Kalamazoo, Mich., a corporation of Delaware No Drawing. Application February 12, 1959
Serial No. 792,725

5 Claims. (Cl. 260—239.55)

This invention is a continuation-in-part of application Serial No. 661,036, filed May 23, 1957.

The new compounds and processes of this invention are illustratively represented by the following formulae:

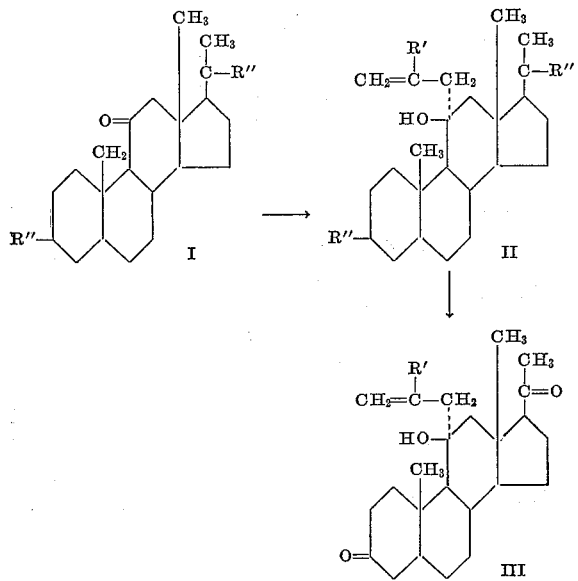

wherein R' is selected from the group consisting of hydrogen and methyl and R'' is a keto protecting group such as (1) an enol acylate wherein the acyl radical is that of an organic carboxylic acid of from one to twelve carbon atoms, inclusive, (2) a cyclic alkylene amine of the formula

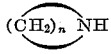

wherein $n$ is an integer four to five, inclusive, and (3) a cyclic ketal radical of the formula

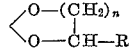

wherein $n$ is the integer one or two and R is hydrogen or lower-alkyl containing from one to six carbon atoms, inclusive, e.g., methyl, ethyl, propyl, isopropyl, butyl, 1-methylpropyl, amyl, hexyl, etc., the 1,2-alkylene ketals being preferred.

The novel 11α-allylated-11β-hydroxy-5β-pregnane-3, 20-diones (III) and the 3,20-bis(ethylene ketals) (II) thereof of this invention are useful in the treatment of hypertension, nervous disorders and related illnesses as tranquilizers and sedatives in both humans and valuable domesticated animals since they possess central nervous system depressant activity and potentiate the activity of barbiturate drugs.

The starting material for this invention, 5β-pregnane-3,11,20-trione-3,20-bis(ethylene ketals) (I), is prepared by the method of Oliveto et al. (J. Amer. Chem. Soc. 75, 486 [1953]).

According to this invention, the novel 11α-allylated-11β-hydroxy-5β-pregnane-3,20-diones (III) can be prepared from the starting steroid compound, 5β-pregnane-3,11,20 - trione - 3,20 - bis(ethylene ketal) (I). 5β-pregnane-3,11,20-trione-3,20-bis(ethylene ketal) (I) is allylated at the 11-position with an allyl metal compound such as allyl magnesium bromide to produce 11α-allyl-11β - hydroxy - 5β - pregnane - 3,20 - dione - 3,20 - bis-(ethylene ketal) (II), which is then hydrolyzed to yield the novel 11α-allyl-11β-hydroxy-5β-pregnane-3,20-dione (III).

The preparation and examples that follow are illustrative of the process and products of the present invention but are not to be construed as limiting.

PREPARATION 1

*5β-pregnane-3,11,20-trione-3,20-bis(ethylene ketal) (I)*

A mixture of 22 g. of 5β-pregnane-3,11,20-trione, 100 ml. of ethylene glycol, 5 g. of para-toluenesulfonic acid monohydrate and 500 mls. of toluene was stirred and refluxed through a water trap for about 24 hours. The mixture was cooled, treated with a solution of 5 g. of potassium hydroxide in 50 ml. of methanol (added with stirring) and washed with four 1 liter portions of water. Filtration through anhydrous sodium sulfate and then through a column of synthetic magnesium silicate, followed by washing the column with a large volume of benzene, yielded a colorless solution which was evaporated to dryness. The residue was recrystallized from Skellysolve B (hexanes) to give 14.9 g. of 5β-pregnane-3,11,20-trione-3,20-bis(ethylene ketal) with a melting point of 138 to 142° C.

Following the procedure of Preparation 1 but substituting for the ethylene glycol above, other compounds giving cyclic ketal radicals of the formula

wherein $n$ is the integer one or two and R is hydrogen or lower alkyl containing one to six carbon atoms, inclusive, e.g., methyl, ethyl, propyl, isopropyl, butyl, 1-methylpropyl, amyl, hexyl, etc., is productive of the corresponding 3,20-diketals.

EXAMPLE 1

*11α - allyl - 11β - hydroxy - 5β - pregnane - 3,20 - dione-3,20-bis(ethylene ketal) (II)*

0.1 mole of allyl bromide was converted to its Grignard reagent by employing the cyclic reaction of Greenlee and Rolands (Tech. Report of Amer. Petroleum Inst. Research Project 45, 9, 33–42 [1950]). The thus produced allyl magnesium bromide, in 100 ml. of ether, was diluted with 100 ml. of purified tetrahydrofuran and chilled to 0° C. in an ice bath. A solution of 4.2 g. (0.01 mole) of 5β-pregnane-3,11,20-trione-3,20-bis-(ethylene ketal) in 20 ml. of purified tetrahydrofuran was added dropwise to the cold Grignard solution. After 1.5 hours, the ice bath was removed and the resulting solution allowed to stand overnight at room temperature. The ether was removed by distillation and the tetrahydrofuran solution heated under reflux for 2 hours. This solution was then diluted with methylene chloride and saturated ammonium chloride solution. The methylene chloride solution was separated, washed twice with water and dried over anhydrous sodium sulfate. After removal of the drying agent the solvent was evaporated under reduced pressure. The product crystallized spontaneously and was dissolved in acetone, treated with Norit (decolorizing charcoal) and recrystallized from a mixture of acetone and Skellysolve B (hexane hydrocarbons) to yield 3.65 g. (79% of theoretical) of pure 11α-allyl-11β-hydroxy-5β-pregnane-3,20-dione-3,20-bis(ethylene ketal) with a melting point of 180 to 186° C. A second crop of material (6.3% of theoretical) weighing 290 mg. was recovered from the mother liquor. A small sample taken from the main crop was recrystallized twice for analysis and had a melting point of 189 to 190° C.

Analysis.—Calculated for $C_{28}H_{42}O_5$: C, 73.32; H, 9.23. Found: C, 73.14; H, 9.63.

The infrared absorption spectrum showed the following maxima: 3540 cm.$^{-1}$, 3050 cm.$^{-1}$, 1640 cm.$^{-1}$, 998 cm.$^{-1}$, and 910 cm.$^{-1}$.

Following the procedure of Example 1 but substituting for 5β-pregnane-3,11,20-trione - 3,20 - bis(ethylene ketal) other 3,20-bis(alkylene ketals) of 5β-pregnane-3,11,20-trione, defined in the paragraph following Preparation 1, is productive of the corresponding 11α-allyl-11β-hydroxy-5β-pregnane-3,20-dione-3,20-bis(alkylene ketals).

EXAMPLE 2

11α-methallyl - 11β - hydroxy - 5β-pregnane - 3,20-dione-3,20-bis(ethylene ketal) (II)

In the same manner as in Example 1, but substituting methallyl magnesium bromide as the Grignard reagent employed, 11α-methallyl-11β-hydroxy-5β-pregnane-3,20-dione-3,20-bis(ethylene ketal) is produced.

Following the procedure of Example 2, but substituting for the starting 5β-pregnane-3,11,20-trione-3,20-bis(ethylene ketal) other 3,20-bis(alkylene ketals) of 5β-pregnane-3,11,20-trione defined in the paragraph following Preparation 1 is productive of the corresponding 11α-methallyl-11β-hydroxy-5β-pregnane-3,20-dione-3,20 - bis-(alkylene ketals).

EXAMPLE 3

11α - allyl - 11β - hydroxy - 5β-pregnane-3,20-dione (III)

2 g. (0.044 mole) of a recrystallized sample of 11α-allyl-11β-hydroxy-5β-pregnane-3,20-dione-3,20 - bis(ethylene ketal) (II) was dissolved in 40 ml. of hot acetone and treated with 10 ml. of 1.0 N sulfuric acid for 2.5 hours. Upon dilution with water, an oil separated. The acetone was removed by evaporation on a steam bath, and the oil extracted with methylene chloride. The methylene chloride solution was washed with water, dried, and then adsorbed onto a column of 100 g. of Florisil (synthetic magnesium silicate). The product was eluted with a mixture consisting of 10% acetone and 90% Skellysolve B to yield 1.58 g. (97.5% of theoretical) of crude product. This material was crystallized from acetone-Skellysolve B and had a melting point of 122 to 123° C. A sample of this product to be used for analytical purposes was recrystallized four times and had a melting point of 123 to 124° C.

Analysis.—Calculated for $C_{24}H_{36}O_3$: C, 77.37; H, 9.74. Found: C, 77.27; H, 9.69.

The rotatory dispersion and nuclear magnetic resonance spectra of this material indicate that it has the same configuration at C–11 as the known 11α-methyl-11β-hydroxy-5β-pregnane-3,20-dione. The infra-red absorption spectrum is consistent with the assigned structure.

Following the same procedure as in Example 3, but substituting for 11α-allyl-11β-hydroxy-5β-pregnane-3,20-dione-3,20 - bis(ethylene ketal) other 3,20-bis(alkylene ketals) of 11α-allyl-11β - hydroxy - 5β-pregnane-3,20-dione defined in the paragraph following Example 1 is also productive of 11α-allyl - 11β-hydroxy-5β-pregnane-3,20-dione.

EXAMPLE 4

11α- methallyl - 11β - hydroxy - 5β-pregnane-3,20-dione (III)

In the same manner as in Example 3, but substituting 11α - methallyl - 11β - hydroxy - 5β-pregnane-3,20-bis-(ethylene ketal) as the starting steroid compound, 11α-methallyl-11β - hydroxy - 5β - pregnane - 3,20-dione is produced.

In the same manner as in Example 4, but substituting for the starting 11α-methallyl-11β-hydroxy-5β-pregnane-3,20-bis(ethylene ketal) other 3,20-bis(alkylene ketals) of 11α - methallyl - 11β - hydroxy - 5β - pregnane defined in the paragraph following Example 2 is productive of 11α-methallyl-11β - hydroxy - 5β - pregnane - 3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 11α - allylated - 11β - hydroxy - 5β-pregnanes represented by the following formula:

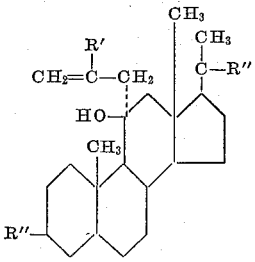

wherein R' is selected from the group consisting of hydrogen and methyl and R" at both the 3 and 20 positions represents the same substituent and is selected from the group consisting of carbonyl oxygen (=O) and a cyclic ketal radical of the formula

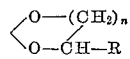

wherein n is selected from the integers one and two and R is selected from the group consisting of hydrogen and a lower-alkyl radical containing from one to six carbon atoms, inclusive.

2. 11α-allyl-11β - hydroxy - 5β - pregnane - 3,20-dione-3,20-bis(ethylene ketal) represented by the following formula:

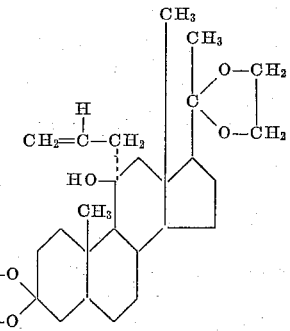

3. 11α - methallyl - 11β - hydroxy-5β-pregnane-3,20-dione-3,20-bis(ethylene ketal) represented by the following formula:

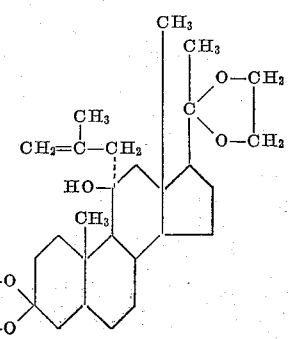

4. 11α - allyl - 11β - hydroxy-5β-pregnane-3,20-dione represented by the following formula:
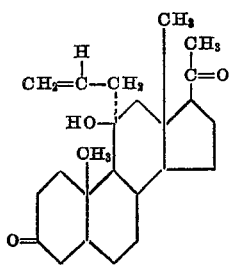
5. 11α - methallyl - 11β - hydroxy-5β-pregnane-3,20-dione represented by the following formula:
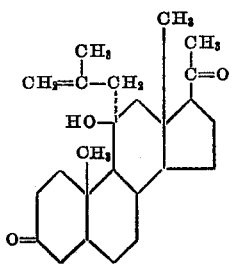
References Cited in the file of this patent
UNITED STATES PATENTS
2,330,215    Hildebrandt _____ Sept. 28, 1943